Jan. 30, 1968 J. T. RUDIS 3,366,349
CENTERBODY THRUST REVERSER

Filed May 2, 1966 3 Sheets-Sheet 1

INVENTOR.
JOSEPH T. RUDIS
BY
AGENT

Jan. 30, 1968   J. T. RUDIS   3,366,349
CENTERBODY THRUST REVERSER
Filed May 2, 1966   3 Sheets-Sheet 3
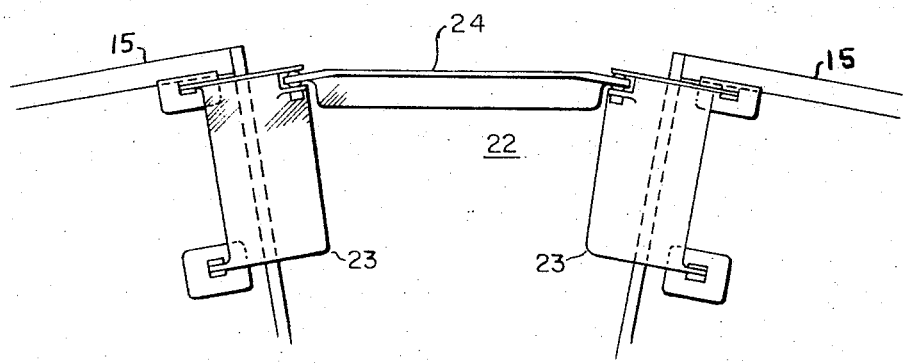
Fig. 4
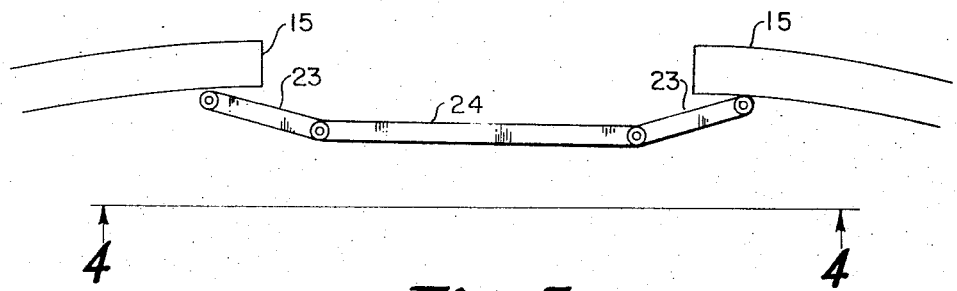
Fig. 5
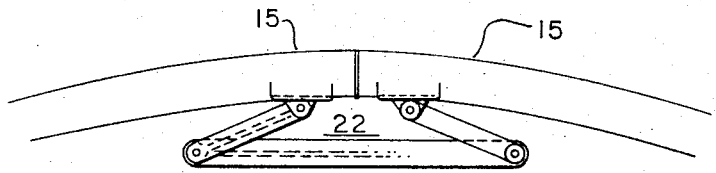
Fig. 6
INVENTOR.
JOSEPH T. RUDIS
BY
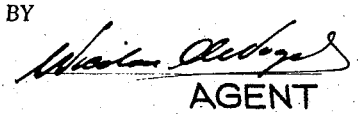
AGENT

# United States Patent Office 3,366,349
Patented Jan. 30, 1968

3,366,349
CENTERBODY THRUST REVERSER
Joseph T. Rudis, San Diego, Calif., assignor to General
Dynamics Corporation, San Diego, Calif., a corporation
of Delaware
Filed May 2, 1966, Ser. No. 554,243
4 Claims. (Cl. 244—53)

ABSTRACT OF THE DISCLOSURE

A thrust reverser which employs a turning vane fabricated of flexible material. The material forms a continuous vane which is retractable with the nacelle housing a jet engine and is located aft of the fan portion of that engine.

The application of thrust reversers to aircraft jet engines in the exhaust forward fan duct section is of relatively recent date; and therefore, the development in this field which is of the greatest importance in the operation of high speed aircraft is still wide open for improvement.

Jet engines, such as the turbo fan engines used in airplanes, are equipped with a thrust reverser unit that is positioned directly after the front fan exhaust portion. Approximately eighty-five percent (85%) of the thrust is developed by the front fan exhaust duct; and therefore, a thrust reverser unit at the far end part of the engine is not required or profitable.

During landing the reverse thrust accomplishes speed reduction in the aircraft. Because of the higher speed developed in the newer airplanes, the means for reducing the speed during flight by flaps and other types of speed brakes are not sufficient; and therefore, by combining a partial reverse thrust together with the existing braking means, a sufficient and effective speed reduction can be obtained.

It is the general object of this invention to provide a fail-safe designed mechanism employing small operating forces for accomplishment of the system.

It is a further object of the present invention to provide a thrust reverser with a high degree of reliability by its design simplicity, its few operating parts, and ease of maintenance and installation.

It is another object of the present invention to provide a thrust reverser which operates from forward to reverse thrust in less than one second.

It is a very important object of this invention to provide a thrust reverser without a plurality of cascades but with a turning vane for reverse thrust having a concave shape and fabricated of a flexible material.

In general, the thrust reverser assembly comprises a series of doors incorporated in the forward nacelle which hinges at the aft end and open outward by hydraulic actuators. Every door has protruding "tucked in" fingers at the forward end on each side. A flexible half-porous shell made from Teflon and/or silicon impregnated nylon provides the turning vane for reverse thrust. Segments of the outer portions of the shell are attached to the forward edges of the hydraulic actuated doors and the inner portions of the shell are attached to the forward edge of a cavity in the nacelle. Between the doors, when opened, unfolded shell material is partly supported by expanded "tuck in" means. In the stowed position, the unsupported segments are folded over the "tucked in" means or finger members. In the reverse thrust positon, the unsupported section completes the half porous shell.

For a better understanding of the invention, reference should be made to the accompanying drawings, wherein.

Figure 3:
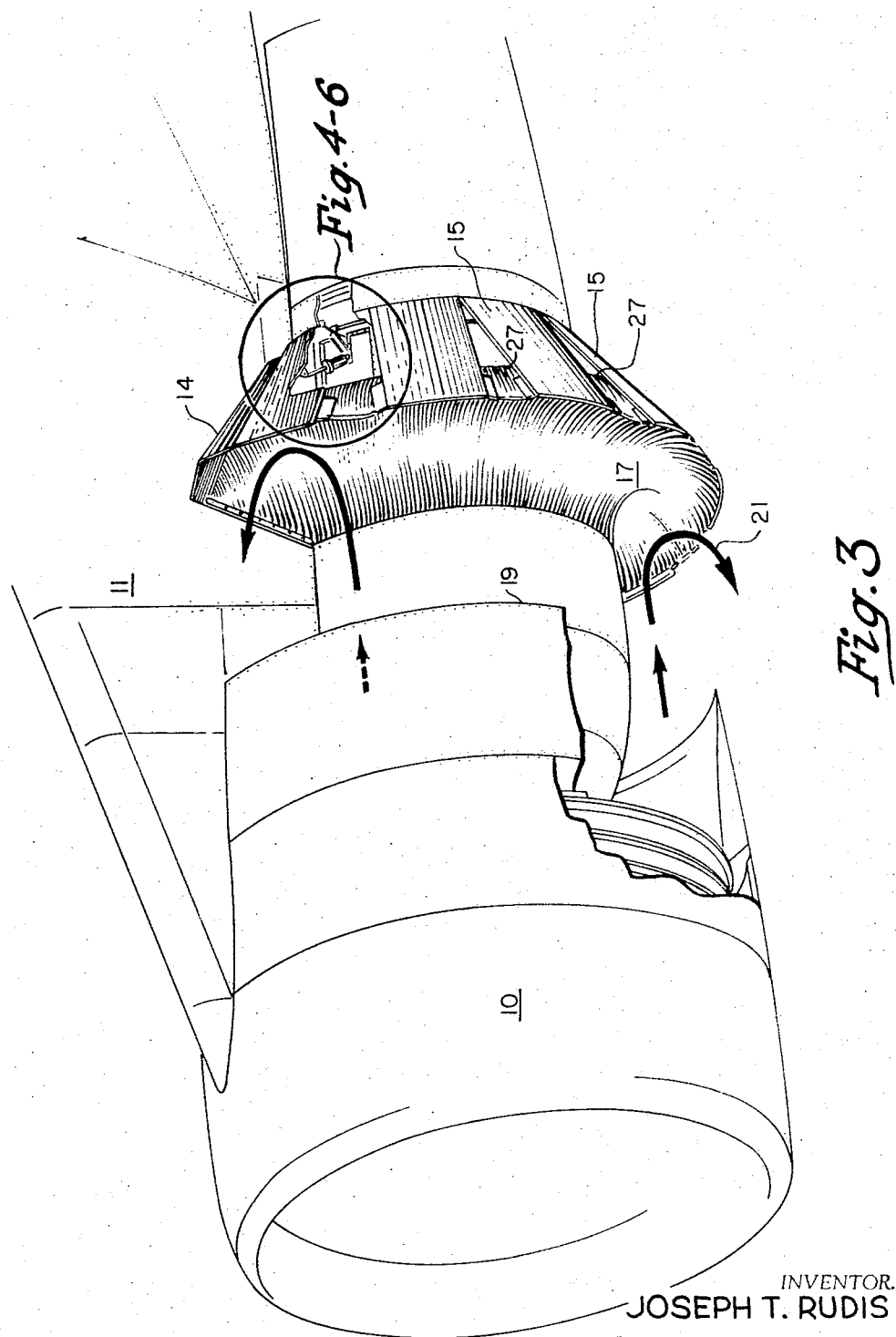

FIGURE 3 illusrtates isometrically the thrust reverser in its activated position.

FIGURE 4 is a partial side view of the tuck-in fingers when the thrust reverser is in its activated position.

FIGURE 5 is a plan view of FIGURE 4.

FIGURE 6 is a plan view of the tuck-in fingers when the thrust reverser is in its inactivated position.

Figure 1:
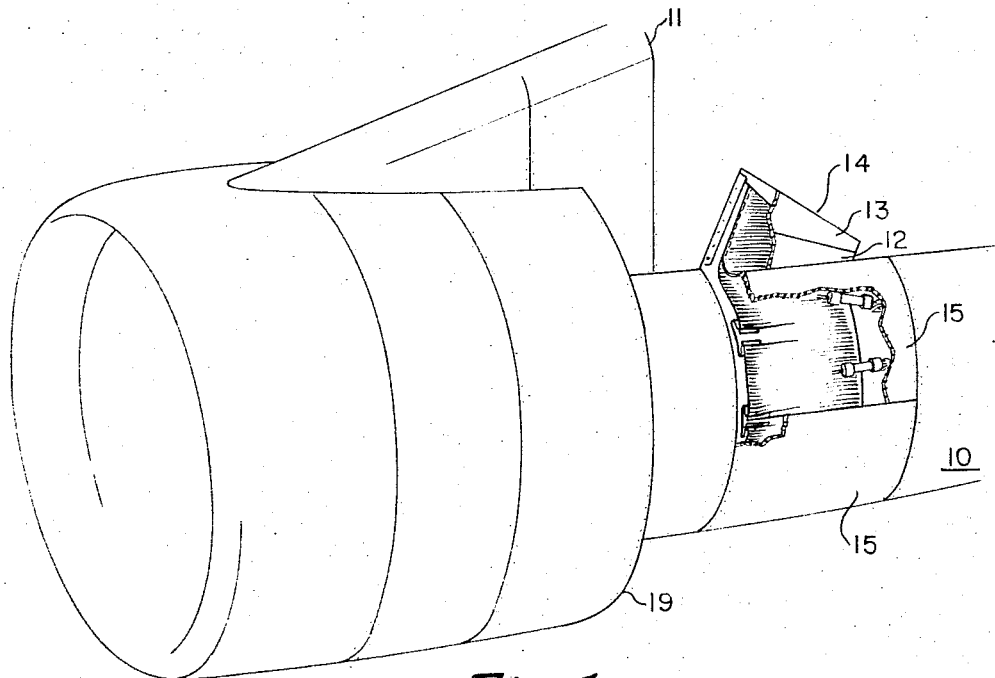
FIGURE 1 is a perspective side view of a jet engine provided with a cut-out section showing the thrust reverser in its inactivated position.

Referring now to the drawings, wherein like reference characters designate corresponding parts in the several views, there is shown in FIGURE 1 a perspective view of a jet engine 10 mounted by a strut 11 to the wings of an airplane (not shown). Part of the jet engine is illustrated with a cut-away section in order to show the thrust reverser mechanism. A double panel 12 and 13 folding door of a triangular shape is provided partly in the strut 11. A series of nacelle doors 15 are shown in a closed position in the nacelle.

Figure 2:
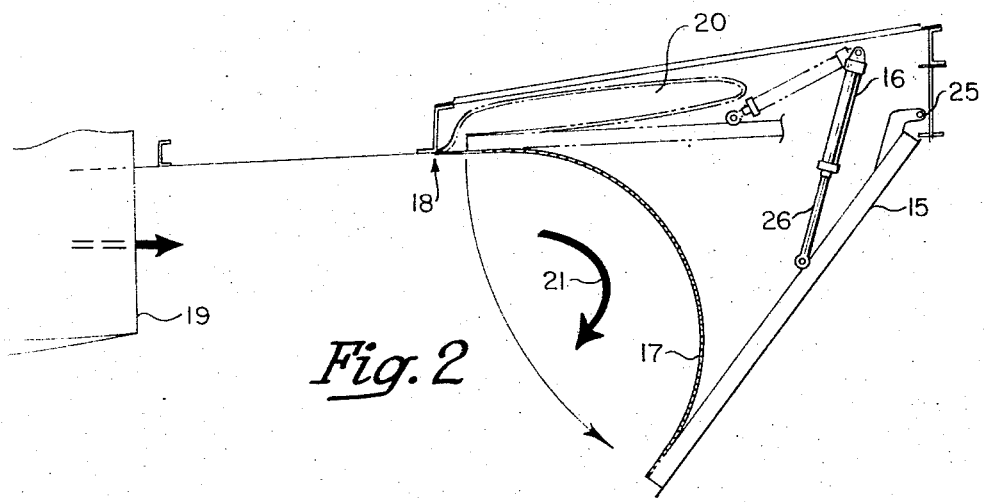
FIGURE 2 shows a section view of the thrust reverser in its activated position, in solid lines, and in the inactivated or stowed position in phantom lines.

Referring now to FIGURE 2 there is illustrated a side view of the thrust reverser in its activated and inactivated position. An hydraulic pivotally mounted actuator 16 is pivotally mounted to the door 15 for opening and closing thereof. The outer edge of door 15 has mounted on the inside a flexible material 17 which folds out into a shell type configuration when the door 15 is in the open position as shown in solid lines in FIGURE 2. The flexible material or turning vane 17 is mounted at the nacelle side at point 18. The fan exhaust duct 19 is shown forward of the thrust reverser assembly. In the inactivated position, the turning vane 17 is folded in the cavity 20 of the nacelle, by the closing of doors 15 activated by the actuators 16.

In FIGURE 3 there is shown in perspective with a cut-out section, the thrust reverser mechanism in its activated position. The reverse thrust is indicated by the heavy arrow lines 21 coming from the fan exhaust duct 19 and reversing in the forward direction after being reflected by the turning vane 17. The triangular door 14 is in its fold-out position and forms a continuous open forward and outward circular periphery of the turning vane 17 from one side of strut 11 to the other. The tuck-in fingers are sustaining in this position the non-supported segments of the flexible material of the turning vane 17.

Referring now to FIGURES 4 and 5, the tuck-in finger means 22 is shown in more detail and comprises a pair of pivotally mounted doors 23 or tuck-in panels which are pivotally connected by an inter-connecting member 24.

In FIGURE 6 there is shown a plan view of the nacelle doors 15 in the closed position, whereby the tuck-in finger means 22 comprising the members 23 and 24, are folded.

Having thus described the several figures by reference characters, the operation of the thrust reverser mechanism is as follows:

Assuming that no thrust reversal of the airflow is required, the thrust reversal mechanism is in its inactivated position which means that the turning vane is folded up into the cavity 20 and the doors 15 are closed providing the nacelle with a continuous aerodynamic surface, which position is illustrated in FIGURE 2 in phantom line fashion.

Upon the requirement for reverse thrust, the pivotally mounted actuators 16 are energized to open the doors 15 outwardly. The doors 15 which are hinged at point 25 in cavity 20 will open to their ultimate position as determined by the stroke of the actuator piston 26. At the same time, the turning vane 17 will exploit in a shell or concave type configuration, due to the stiffness and rigidity built into the material. Also, the door assembly 14 which is hingedly mounted at each side of the strut 12 will open and provide a continuous reverse thrust vane in alignment with the fan exhaust duct 19.

When the doors 15 are in the fully extended open position, the unsupported segments of the turning vane material 27 are resting against the tuck-in members 23 and interconnecting member 24. This tuck-in mechanism 22 also provides a limiting opening stop for the doors 15. Upon cancellation of reverse thrust requirement, the actuator 16 will be energized and the doors 15 closed thereby. The flexible vane material 17 will fold into the cavity 20 and the tuck-in mechanism members 23 and 24 will prevent the material from getting caught in between the doors 15 while closing and further provide proper fold-up of the flexible material in cavity 20. The doors 15 will close into the cavity 20 so that the aerodynamic surface of the nacelle is restored, as well as the doors 12 and 13 of the door assembly 14 which will fold into the strut 11 so that a smooth surface is provided.

It should be understood that the angle of the doors 15 could be provided with adjustable stop means so that partial or complete reverse thrust of various percentages would be obtained.

Although many minor structural modifications might be suggested to the preferred embodiment herein described by way of illustrative example only, it should be understood that many changes could be effected to exemplary structures herein described without departing from the spirit of the present invention and, accordingly, it should be further understood that the inventor wishes to enclose within the scope of the patent warranted hereon all such modifications as reasonably and properly come within the scope of the inventor's contribution to the art.

I claim:

1. A thrust reverser for engines with bypass fan exhaust ducts comprising in combination:
   a plurality of doors pivotally mounted about the circumference of said engine, aft of said fan exhaust duct,
   actuating means linked to said doors for opening and closing thereof, and
   a flexible material secured between said doors and said engine circumference whereby said material assumes a radial extended position for redirecting airflow when said doors are in open position,
   wherein each said door comprises a rear edge, a forward edge and sides, and are pivotally mounted at said rear edge along a circumferential plane substantially perpendicular to said engine longitudinal center axis and wherein said doors are linked with each said adjacent door by an interconnecting folding means at each side,
   said folding means comprising a pair of inward pivotally mounted tuck-in panels pivotally interconnected by an interconnecting member for supporting said flexible material in said open position and for tuck-in of said flexible material during closing of said plurality of doors.

2. A thrust reverser for aircraft power units, comprising in combination:
   a turbo fan engine supported by the wing strut of said aircraft having bypass fan exhaust duct means at the forward circumferential portion of said engine,
   a plurality of nacelle doors, closing a compartment, pivotally mounted about the circumference of said engine, aft of said fan exhaust duct means and adapted to open into a radial outward extending support structure about said engine circumference,
   drive means linked with each said nacelle doors for opening and closing,
   foldable panels at each side of said strut, hingingly attached between said strut and adjacent nacelle door to cooperate into said circular radially extending structure about said engine circumference aft of said duct means,
   a flexible composite material adapted to fold and unfold into a substantial concave turning vane configuration, radially positioned about said engine circumference by being secured between said nacelle door, said foldable panels and said compartment, and
   said nacelle doors being interconnected by finger members, said members comprising a pair of panels pivotally mounted at each said adjacent nacelle door and interconnected by a pivotally mounted thereinbetween positioned interconnecting member for tuck-in of said flexible material during closing of said doors by said drive means.

3. A thrust reverser mechanism for engines having bypass fan exhaust means comprising in combination:
   (a) a turning vane of flexible material having a substantial circular shape with a substantial circular cutout which inside circular periphery is secured at said engine circumference at a location aft of said exhaust means and along a circumferential plane substantially perpendicular to said major axis of said engine,
   (b) a plurality of nacelle doors, having a forward and rearward end position, pivotally mounted at said rearward end portion about said engine circumference parallel and aft of said secured location, for forming a support structure in a forward outwardly opened position during reverse thrust requirements and having secured thereon, at said forward end portions said turning vane outside circular periphery interrupted by non-secured segments between each said doors,
   (c) a compartment about said engine provided with means connected between said nacelle doors and said compartment for closing said compartment by said doors for stowing said turning vane and, for opening said doors for unfolding said vane into said forward opened position during said reverse thrust requirements, and
   (d) pivotally arranged folding finger means interconnecting said forward end portions of said nacelle door with each said adjacent nacelle door to form a continuous support to said outside circular periphery of said turning vane whereby said segments are supported by said finger means in said thrust reversed position and whereby said finger means are adapted to tuck-in said flexible material segments into predetermined folds during closing of said finger means are adapted to tuck-in said flexible material segments into predetermined folds during closing of said nacelle doors by said activating means into said stowing position.

4. A thrust reverser mechanism for engines having bypass fan exhaust means as claimed in claim 3 wherein said pivotally arranged folding finger means comprises a pair of pivotally mounted panels which are pivotally connected by an interconnecting member adapted to fold inwardly towards said engine compartment.

References Cited
UNITED STATES PATENTS

| | | | |
|---|---|---|---|
| 3,228,634 | 1/1966 | Chakoian et al. | 244—113 |
| 3,280,561 | 10/1966 | Kutney | 60—230 X |
| 3,302,404 | 2/1967 | Gist | 244—113 |
| 3,312,429 | 4/1967 | Hull et al. | 244—113 |

MILTON BUCHLER, Primary Examiner.

B. BELKIN, Assistant Examiner.